United States Patent [19]

Clarke-Pounder et al.

[11] Patent Number: 5,053,123
[45] Date of Patent: Oct. 1, 1991

[54] ADJUSTABLE VALVE FOR VARYING FILTRATE COMPOSITION FROM FILTERS

[75] Inventors: Ian J. H. Clarke-Pounder, Nashua, N.H.; Richard L. Smythe, Senneville; Marcel A. Carboneau, Sherbrooke, both of Canada

[73] Assignee: Ingersoll-Rand Company, Woodcliff Lake, N.J.

[21] Appl. No.: 338,571

[22] Filed: Apr. 17, 1989

[51] Int. Cl.⁵ ............................................. B01D 29/92
[52] U.S. Cl. .................................... 210/138; 210/247; 210/406; 210/422; 210/486; 210/238
[58] Field of Search ............... 210/332, 331, 346, 347, 210/345, 390, 392, 406, 422, 423, 486, 138, 247, 238

[56] References Cited

U.S. PATENT DOCUMENTS

| | | | |
|---|---|---|---|
| 3,233,736 | 2/1966 | Vernay | 210/406 |
| 3,363,774 | 1/1968 | Luthi | 210/406 |
| 3,409,139 | 11/1968 | Jackson et al. | 210/406 |
| 3,452,874 | 7/1969 | Keller et al. | 210/331 |
| 3,471,026 | 10/1969 | Riker | 210/332 |
| 3,517,818 | 6/1970 | Luthi | 210/392 |
| 4,136,028 | 1/1979 | Toivonen | 210/331 |
| 4,207,190 | 6/1980 | Sheaffer | 210/331 |
| 4,683,059 | 7/1987 | LaValley | 210/392 |
| 4,814,093 | 3/1989 | Frykhult | 210/331 |
| 4,999,104 | 3/1991 | Krieger | 210/247 |

Primary Examiner—Robert A. Dawson
Assistant Examiner—Joseph Drodge
Attorney, Agent, or Firm—Walter C. Vliet

[57] ABSTRACT

Disclosed is an adjustable valve for use with filters wherein internal valve partition members effect the relative duration and timing of withdrawal of the atmospheric and vacuum portion of filtrate from the filter. The valve further provides for the distribution of filtrate to clear or cloudy sump wells depending on the concentration of particulate matter contained in the filtrate portions. Timing and apportioning of the filtrate is accomplished by a combination timing plate and valve housing containing movable valve partitions, the valve body being in communication with a vacuum box and atmospheric drains.

11 Claims, 6 Drawing Sheets

ADJUSTABLE VALVE FOR VARYING FILTRATE COMPOSITION FROM FILTERS

BACKGROUND OF THE INVENTION

Experience in testing operating filters on a wide variety of paper making pulps has led to a number of conclusions. The manner in which pulp fibers form a sheet and the manner in which such a pulp sheet retains fine particulate matter is dependent upon the type of fiber and the mechanisms by which it is separated from the carrier liquid. During the filtration cycle the fibers retained on a wire mesh form a fibrous mat and the clarity of the filtrate improves with time as the fiber interstices fill up with more and more fine material.

Different pulps require different conditions to form a pulp mat as well as dry a pulp mat and also to optimize the clarity of the "clear" portion of the filtrate.

In the pulp and paper industry, disc and other rotary type filters are used for two primary purposes:

1. To thicken pulps by removing liquid under a combination of gravity and vacuum induced drainage.

2. To act as save-alls and recover separated liquid into filtrate streams containing little particulate matter and streams containing more particulate matter.

For the best disc filter operation a slow draining pulp requires a relatively short time for atmospheric initial pulp mat formation, and a long "vacuum on" cycle to finish forming the pulp mat and to dry the mat as much as possible. A fast draining pulp requires a relatively short "vacuum on" time cycle. The atmospheric mat formation can also be short but a lengthened atmospheric cycle time will give benefit in improved pulp mat formation and disc filter operation.

Even with prior pulp testing it has in the past been impossible to predict and design exactly the optimum disc filter "atmospheric/vacuum on timing" for a given pulp. In addition, some operators must vary their pulp characteristics from day to day depending on the products they wish to manufacture. A single fixed design valve cannot perform satisfactorily under a wide range of feed conditions. The adjustable valve described in the attached disclosure is designed to allow adjustment for a wide variation in the length of "atmospheric on" and "vacuum on" cycles while the filter is operating. In addition, an extra atmospheric leg has been added to the normal filter operation to enable separation of atmospheric filtrate into super clean and atmospheric clean filtrate portions.

OBJECT OF THE INVENTION

The object of the invention is to provide the ability to adjust the disc filter valve while the disc filter is operating for optimum operation based on the characteristics of each pulp. A further object of the invention is to provide the ability of readjusting the disc filter valve timing for a change in pulp characteristics while maintaining optimum disc filter operation. A further object of the invention is to increase the disc filter capacity due to improved control of the initial atmospheric mat formation. A further object is the ability to change the relative volumes of different filtrates during operation; the ability to change clear filtrate volume during operation; and the ability to change atmospheric filtrate volume during operation. These and other objects are obtained in an adjustable valve for a disc filter comprising: a valve timing plate in sealing engagement against the revolving collection channels of the center shaft of a rotary disc filter; the valve sealing plate having porting means therein for segregating atmospheric withdrawn filtrate portions and vacuum withdrawn filtrate portions; a hollow partial cylindrical valve housing having a predominantly open face for receiving the collection disc plate and a partially open distributor plate at its other end; the valve housing containing a movable valve means cooperating between the timing disc plate and the distributor plate to adjust a point of collection and distribution of atmospherically collected filtrate; and, a means for proportionately receiving and distributing vacuum collected filtrate.

DESCRIPTION OF THE PREFERRED EMBODIMENT

Figure 1:
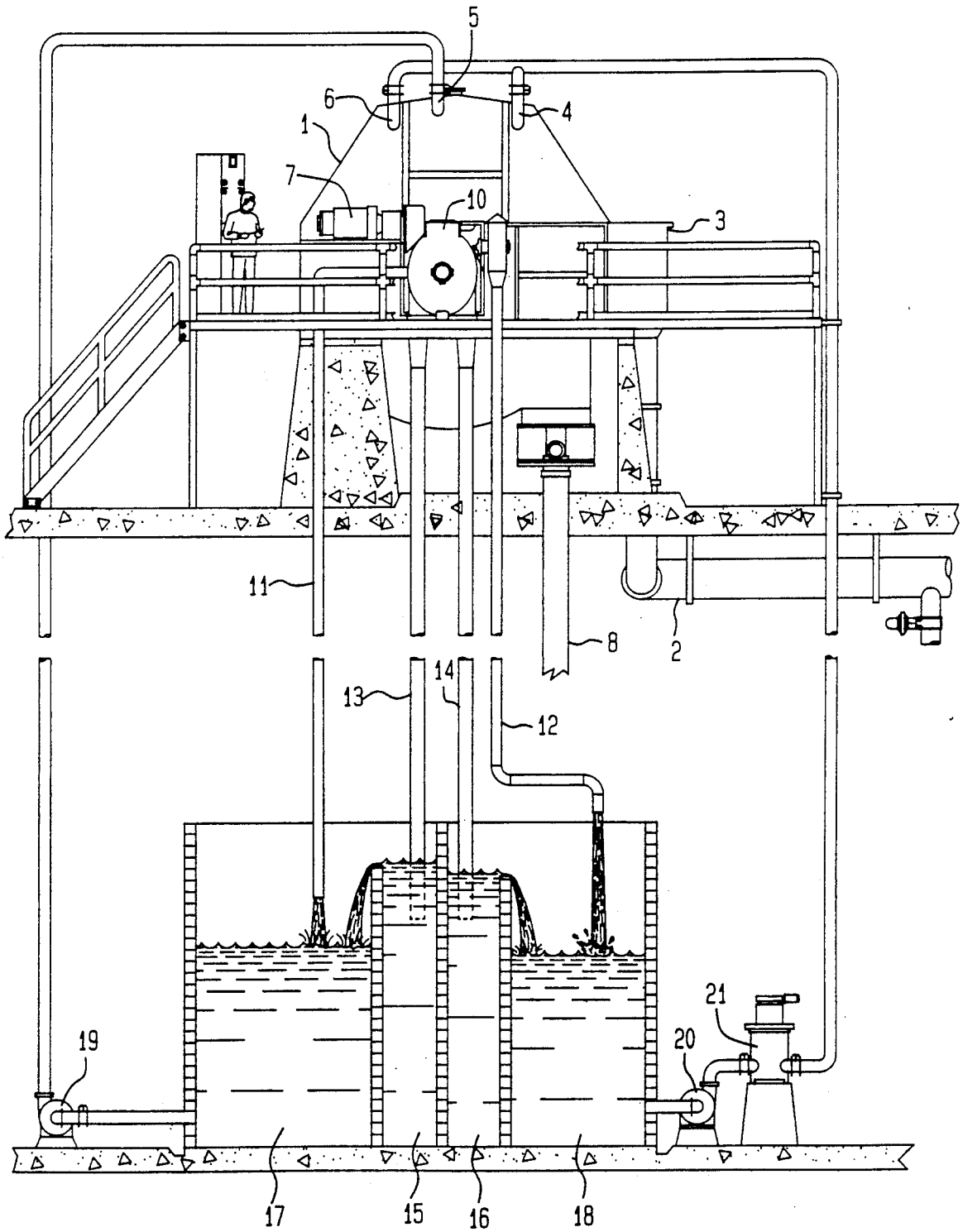
FIG. 1 is a pictorial end view of the overall piping arrangement for a rotary disc filter.
Figure 3:
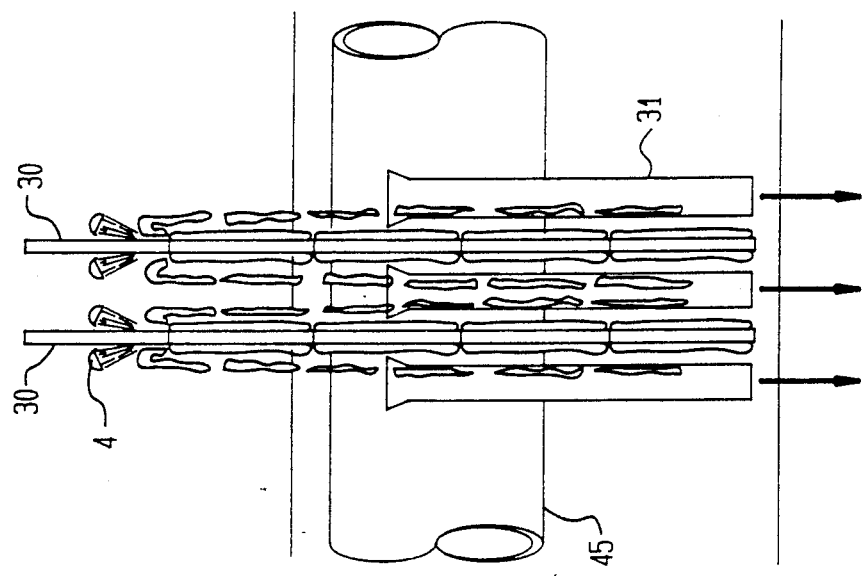
FIG. 3 is a schematic cross sectional view of the rotary drum filter showing orientation of the disc.

Referring now to FIG. 1, a schematic diagram of the overall layout of a disc filter is shown. The disc filter is generally indicated by Reference Numeral 1. Shown entering the disc filter drum are the stock inlet piping 2 which enters the disc filter 1 through an inlet box 3, also shown entering the disc filter cover are piping to service the knock off shower 4 (best seen in FIG. 3), the sluice shower 5, and the face cleaning shower 6.

In the center of the viewed end is an adjustable valve 10 for the disc filter according to the present invention. Shown to the left of the valve is a drive motor and gear reducer combination 7 which provides for rotation of the disc filter. Shown exiting the disc filter drum is the pulp discharge pipe 8.

The adjustable valve housing 10 is provided with four discharge pipes. Shown to the left is the cloudy filtrate atmospheric drain pipe 11, to the right is the clear filtrate atmospheric drain pipe 12. The remaining two drain pipes are a cloudy barometric (vacuum) leg 13 and a clear barometric (vacuum) leg 14 which produce the required vacuum for operation of the filter. The above pipes 13 and 14 enter the appropriate clear or cloudy drainage wells 15 and 16 respectively through suction seals. The atmospheric drain pipes discharge into chambers 17 and 18 respectively for the atmospheric cloudy leg 11 and the atmospheric clear leg 12.

A pump 19 is provided to recirculate the cloudy filtrate to, for example, the sluice shower 5 and a pump 20 is shown for recirculating clear filtrate which may be further clarified in a strainer 21 for recycle to, for example, the knockoff shower 4 and the face cleaning shower 6.

Figure 2:
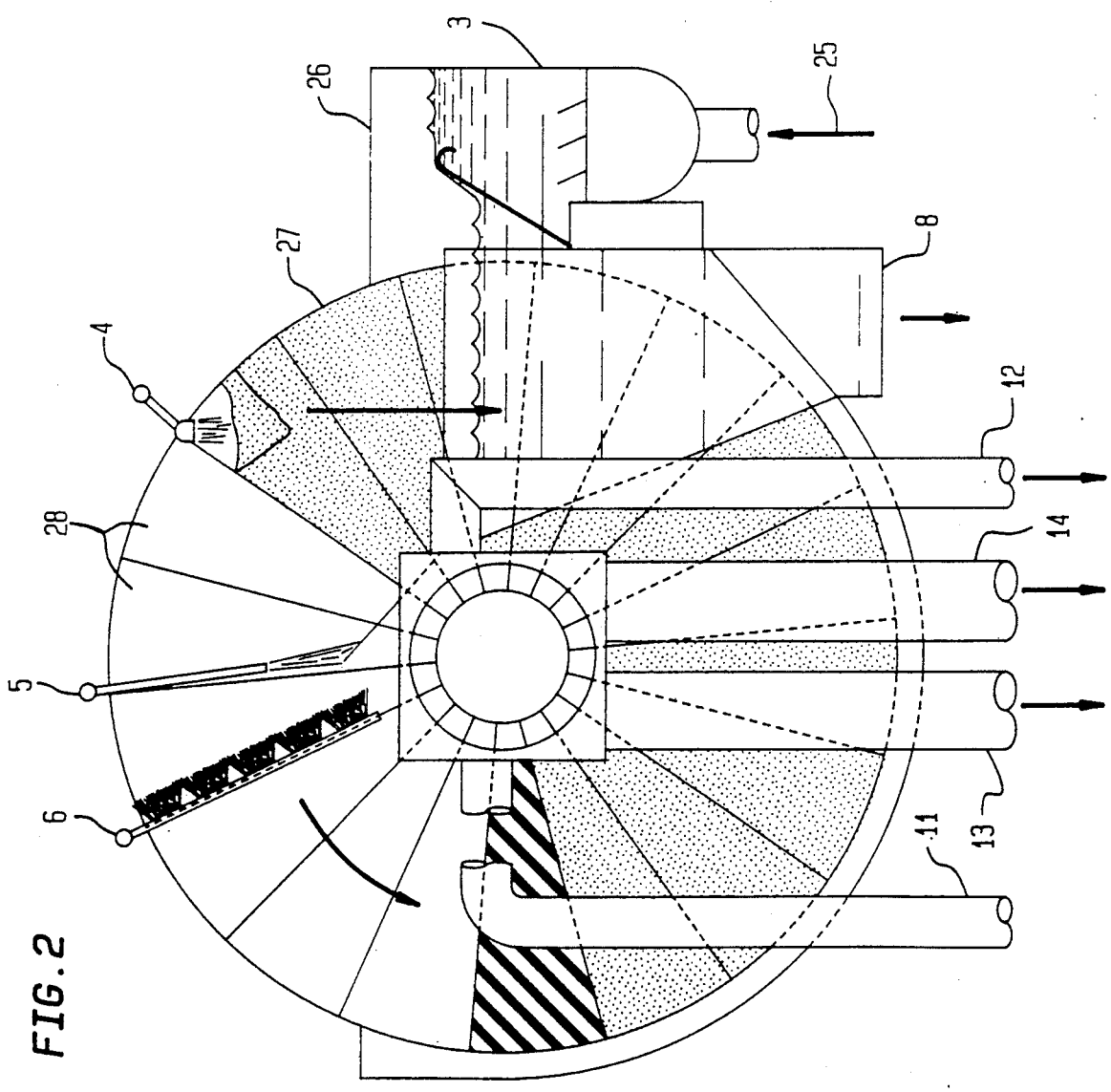
FIG. 2 is a schematic diagram of the cross section of a rotary drum filter.

Referring now to FIG. 2, in a conventional pulp disc filter the fibrous pulp material 25 is fed into an inlet box 3 located at the side of the disc filter vat 27 which is formed in the shape of a cylindrical drum. In typical operation vat 27 is filled to slightly over center level of the rotating shaft. Filtration is accomplished by rotating the individual pie shaped sectors 28 which form the discs 30 (best seen in FIG. 3) through 360 degree rotation. This takes the individual pie shape sectors 28 through a sector wherein they are submerged in the pulp and through a sector wherein the pulp that is filtered and formed on filtering surfaces of pie shaped sectors 28 are stripped from the screen like filtering surface and collected in the discharge troughs 31 and finally deposited in the discharge header and pulp discharge pipe 8.

To better understand the nature of the present invention it is desirable to understand the sequence of filtration and fiber mat formation. In referring to FIG. 2, as previously stated, pulp is fed into the inlet box 3 and from there flows into the vat wherein a level of approximately half or greater of the diameter of the disc 30 is maintained. Taking the sequence from just before the pie shaped sector 28 enters the pulp and considering counterclockwise rotation as viewed in FIG. 2, a fiber mat forms on the filtering surfaces of the sector as it begins to submerge. At some optimum time after complete submergence of the sector, vacuum is applied to induce a greater pressure differential across the initially formed pulp mat thereby promoting more filtrate to be drawn through the mat while at the same time increasing the deposit of more fibers on the mat.

As more fibers are deposited this results in increased filtrate clarity as the fiber mat thickens. The filtrate obtained during the initial portion of the cycle contains fine material and fibers which passes through the filtering surfaces of the sectors during initial formation of the fiber mat. The initial or cloudy filtrate can be recycled for clarification or used for dilution purposes elsewhere. The latter progressively cleaner, clear filtrates can be separated from the cloudy filtrate in the valve box. These clear filtrates are sufficiently clear to be used for shower water or for disposal to the environmental treating system.

The vacuum is cut off upon emergence of the sector from the pulp. The fiber mat is further dewatered by residual vacuum until the sector reaches the knockoff shower which cuts the top of the mat loose from the filtration media. The mat then peels off and falls into the chute 31 provided between the discs. Sluice showers keep the chute clean and lubricated and can also be used to dilute the mat so that the recovered stock is near to process consistency. Cleaning of the filtration area is assured by face cleaning showers prior to the segments again entering the pulp for a repeat cycle.

To this point the description has been fairly standard of the pulp disc filter process. Further, in the past it has been the practice to close off the atmospheric drain prior to the entrance of the segment into the pulp and upon submergence apply vacuum to the segment, the vacuum being shut off prior to sheet removal. In general, the atmospheric drain was open and the relatively clear atmospheric drain material was returned to the clear well 16.

It was also fairly common practice to split the vacuum obtained filtrate into a cloudy and a clear filtrate segment for further use in the filtrate process. In the prior art, atmospheric and vacuum split was accomplished with a fixed timing valve wherein the timing of the atmospheric drain and the application of vacuum was set during design based on a typical or given expected pulp drainage characteristics.

It has been found in practice to be desirable to change the timing depending on the actual operating drainage characteristics of the pulp sensed by the filter and it has further been found desirable to allow the initial mat formation to take place under atmospheric conditions in two sequential stages for a longer time especially for slow drainage pulps. In this case the mat becomes formed prior to application of the vacuum thereby minimizing fibers being pulled through into the filtrate thus also producing a better and more consistent mat. The initial atmospheric filtrate, however, is very clear since it is the last remnants of the previous filtering cycle which is pushed out of the sectors and channels by new incoming cloudy filtrate and it has been found desirable to separate the atmospheric filtrate by means of a second atmospheric drain to the cloudy well. The present invention accomplishes these desired results by providing for a second atmospheric drain as well as providing varied timing of the atmospheric drain by adjusting the application of the vacuum on. The present invention also provides for a variation of the split of the vacuum filtrate going to the cloudy and clear well.

Figure 4:
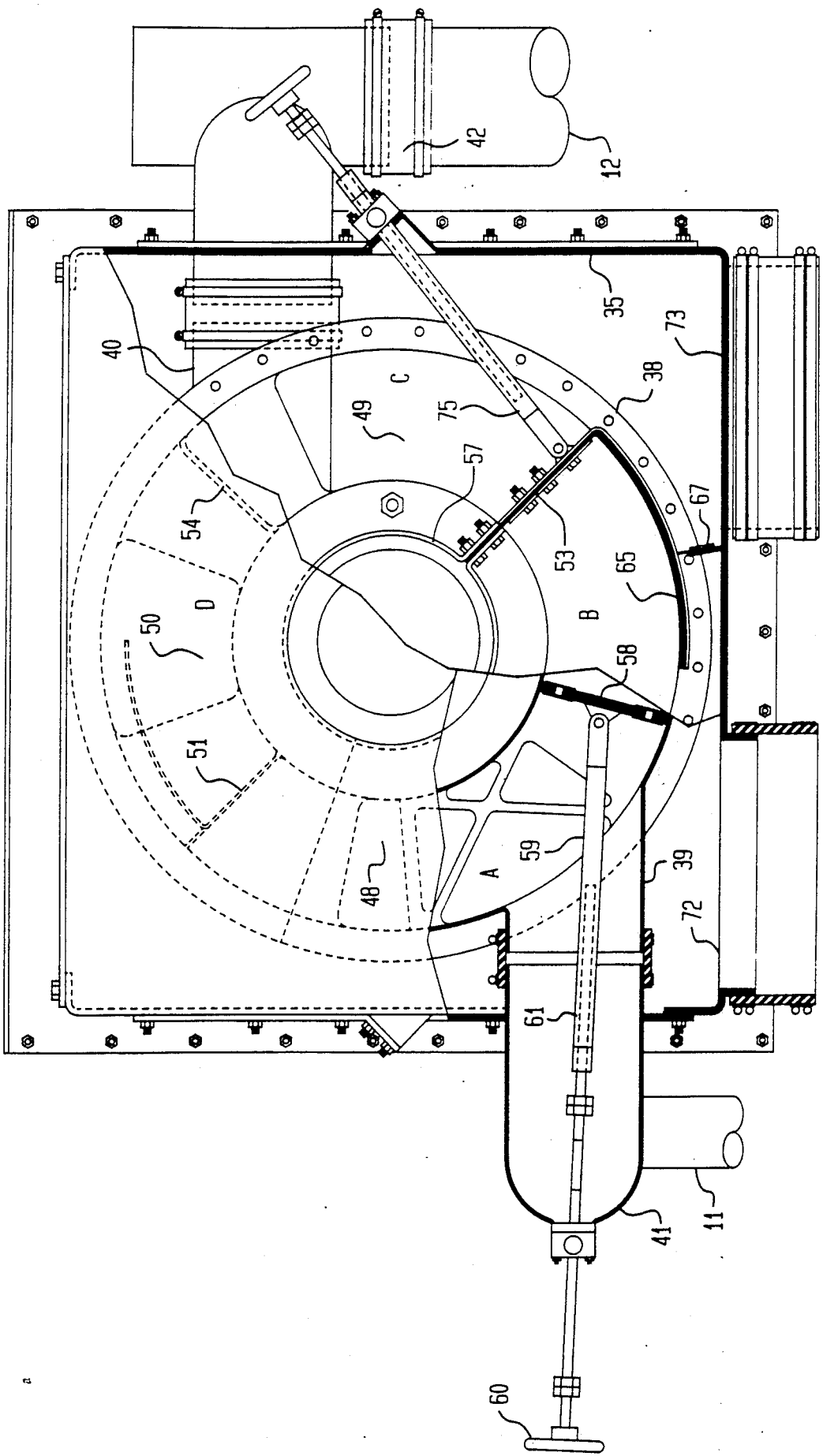
FIG. 4 is a sectional end view of an adjustable valve for disc filters according to the present invention.
Figure 5:
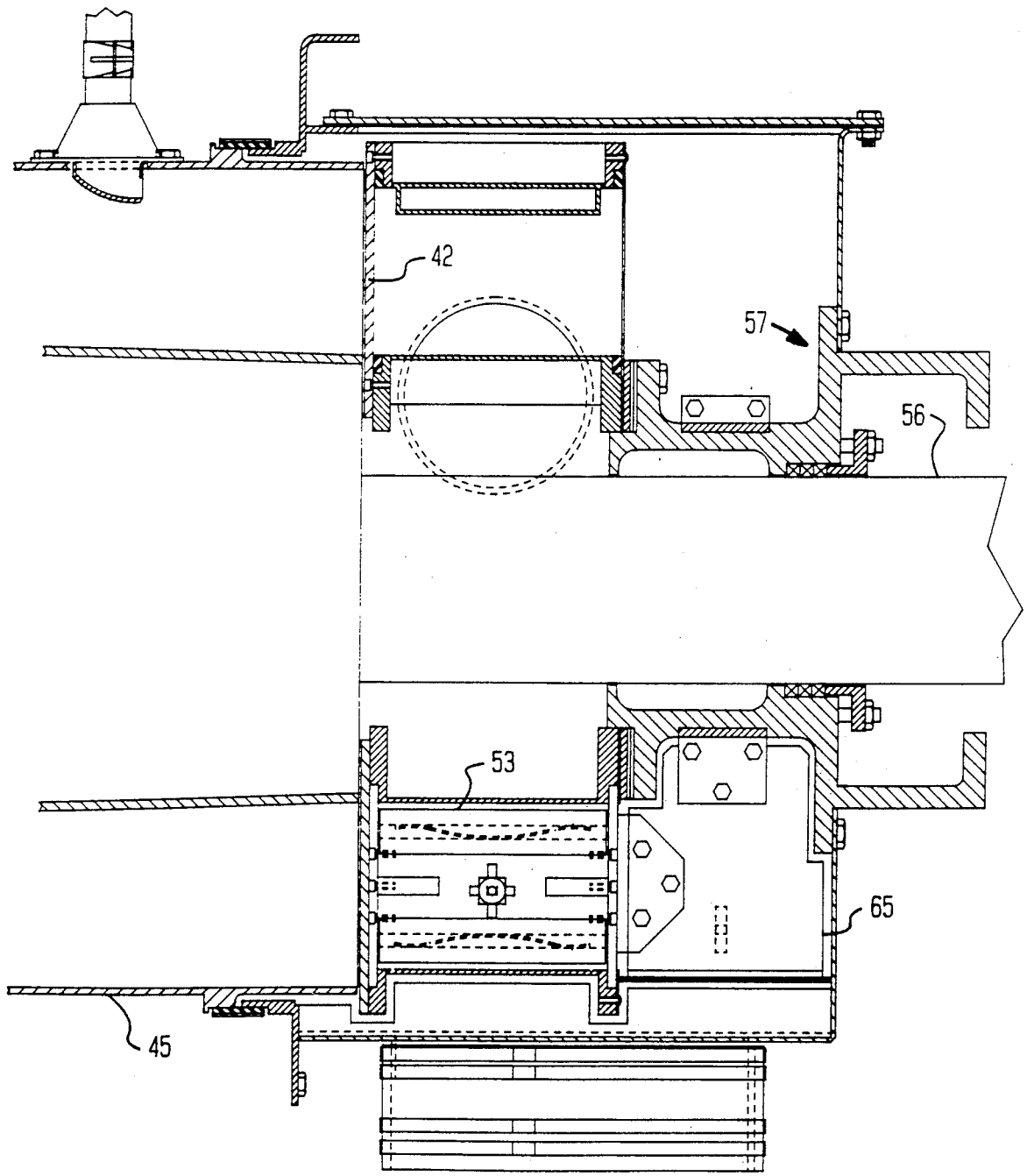
FIG. 5 is a sectional side view of an adjustable valve for a disc filter according to the present invention.

FIG. 4 shows a sectioned view of a valve according to the present invention installed in a vacuum box 35. Again, referring to FIG. 4 for details of construction and FIG. 6 for general layout, it will be appreciated that the valve housing 36 is formed from a hollow cylindrical segment having a flange 37 on the inlet side and a flange 38 on the outlet or discharge side.

Spaced about the periphery of the valve body are an atmospheric outlet drain for cloudy filtrate 39 and an atmospheric outlet drain 40 for clear filtrate. Both of the atmospheric drains connect from the valve body and conduct filtrate outside of the vacuum box 35 and finally respectively through connected piping 41 to the drain pipe 11 and the cloudy well 17, and through drain piping 40 through drain pipe 12 to the clear filtrate well 18.

Mounted to flange 37 is a valve timing seal plate 42 which cooperates with the center shaft 45 of a disc filter. The shaft of the disc filter has a hollow center 46 surrounded by individual drainage channels 47 which connect with the individual filter segments. The drainage channels 47 deliver the filtrate collected in each disc segment to the end of the disc filter where it is received and distributed by the distribution valve.

Figure 6:
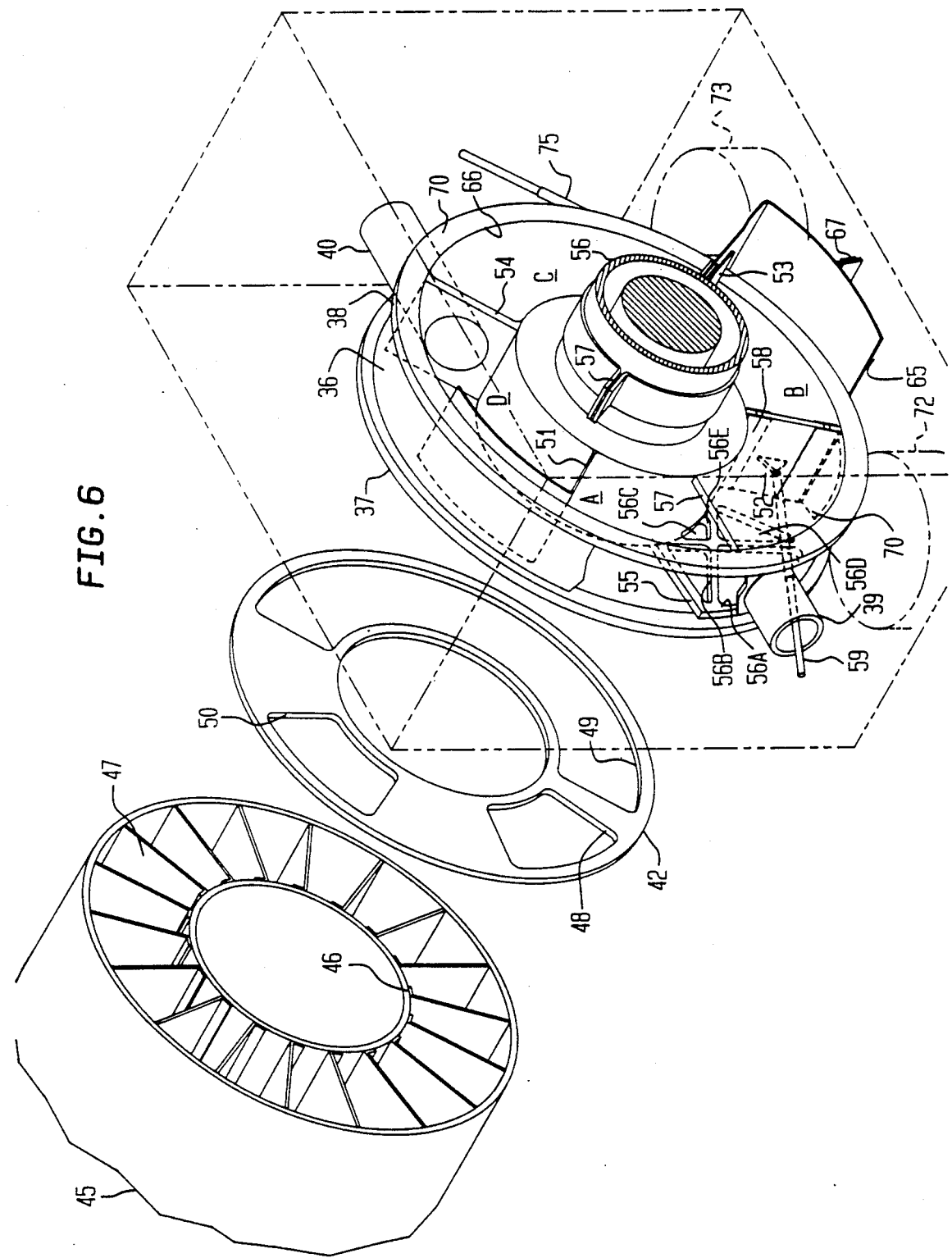
FIG. 6 is a schematic exploded assembly view of an adjustable valve for a disc filter according to the present invention.

As seen in FIG. 6, the filtrate is received in the valve through the valve collection disc plate 42 which is provided with three apertures for that purpose. The first aperture is the port 48 for receiving the cloudy atmospheric filtrate. Port 49 receives the vacuum filtrate and port 50 receives the clear atmospheric filtrate.

It should be appreciated by one skilled in the art that filtrate exiting the disc filter by means of the longitudinal flow channels 47 will enter the interior of the valve body 36 through one of the three ports in the valve timing plate depending on the channels radial location at the time of discharge. This also determines whether or not the flow channel is subject to atmospheric pressure or vacuum and depending on the radial position of the sector. This in turn will define the total differential pressure acting to form the pulp mat on the sector filter surface and thereby will determine the clarity of the filtrate.

The interior of the cylindrical section of the valve body is separated into a series of four chambers by four baffles, two of which, as will be explained later, are adjustable in their radial position. Chamber A is formed between an atmospheric filtrate separation baffle 51 and the seal plate 58 of movable valve 52. Chamber B is formed between the movable seal plate 58 and a movable vacuum filtrate splitter plate 53. Chamber C is formed between the movable filtrate splitter plate 53 and a fixed clear filtrate baffle 54. Chamber D is formed between the clear filtrate baffle 54 and the bent fixed baffle 51.

Figure 7:
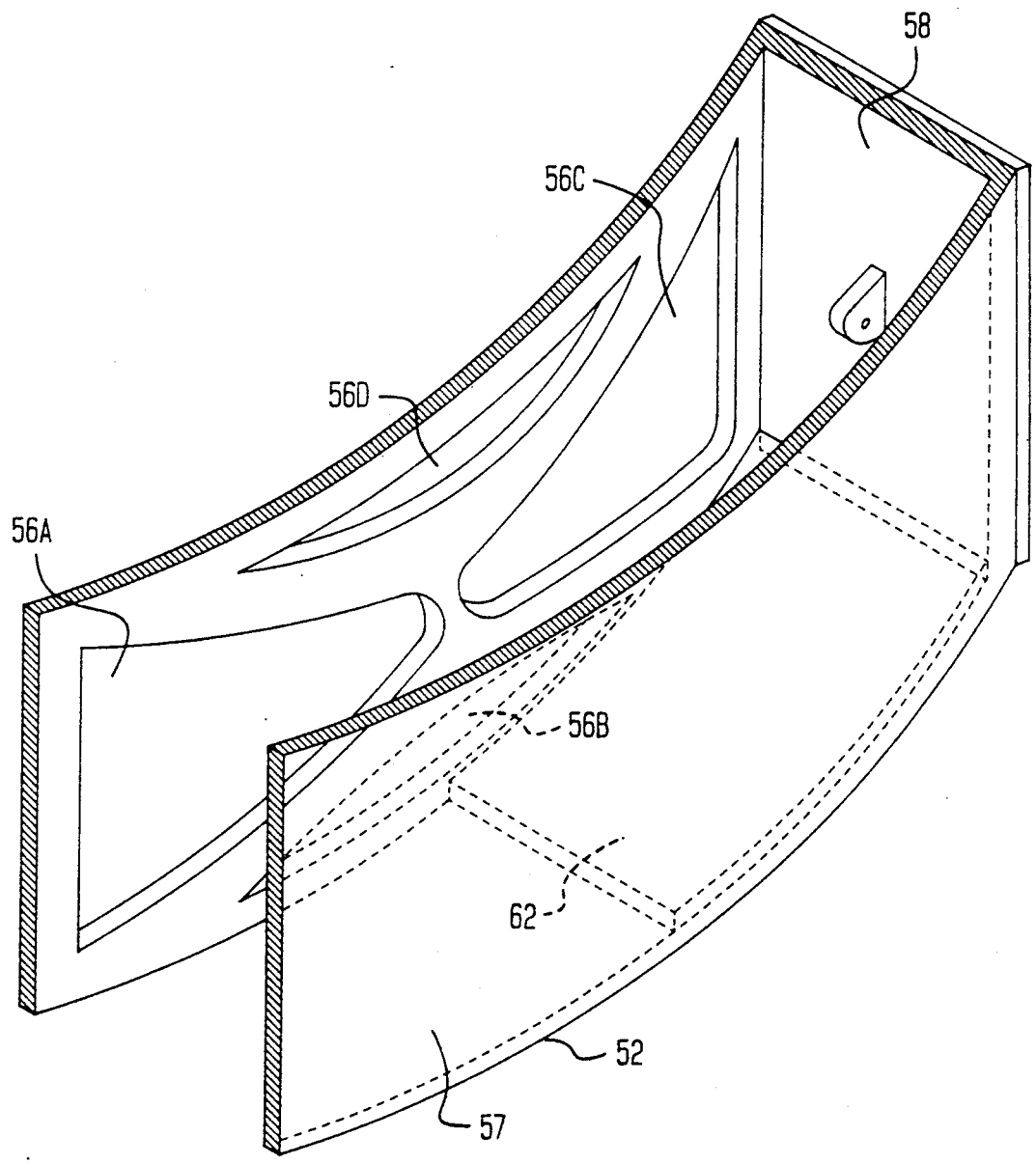
FIG. 7 is an isometric view of the movable valve segment according to the present invention.

As shown in FIG. 7 movable baffle 52 is formed from two angular segments and a sealing end plate 58. The inlet angular segment 55 is provided with a series of ports 56A through 56D which cooperate with the port 48 in the disk valve plate 42 to allow filtrate to enter Chamber A. Angular sealing segment 57 and bottom plate 62 do not contain perforations and their function is to seal off cloudy atmospheric filtrate from the vacuum box 35 when the seal plate 58 extends beyond the edge of port 49 as shown in FIG. 6. The position of the movable valve 52 is determined by control rod 59 which varies in length as determined, for example, by rotation of hand wheel 60 in a conventional manner. In the present case, rotation of the hand wheel 60 extends the control rod 59 by extension of threads 61 best seen in FIG. 4 thereby moving the movable valve 52 in a circular manner within valve 52 in a circular manner within valve body 36 between inlet flange 37 and outlet flange 38. It will be appreciated that extending control rod 59 forces the seal plate 58 and hence the movable valve 52 to the right as shown in FIG. 4 and FIG. 6 thereby extending Chamber A and conversely reducing Chamber B.

Splitter plate 53 is mounted for rotation about collar 56 on a collar strap 57. Splitter plate 53 splits the filtrate collected into cloudy and clear filtrate in chambers B and C respectively. An offset 65 is sealed at each end of the vacuum box 35 and along the bottom by seal 67. The splitter plate 53 with its offset 65 allows for selection of a greater proportion of cloudy filtrate if required.

The cloudy vacuum filtrate exits through the barometric cloudy drain 72 into barometric leg 13 which produces the vacuum required for application to the filter sectors in contact with port 49 of valve sealing plate 42. Clear filtrate enters chamber C of the valve housing 36 through port 49 as separated by splitter plate 53 and exits the valve through Chamber C and port 66 which is the essentially open end of the valve to be discharged through barometric drain 73 to barometric leg 14. This also adds to the vacuum available in the vacuum box in a conventional manner for such filters.

Chamber D receives atmospheric filtrate from port 50 as the filter segments leave the pulp and go through the top half rise of the filter chamber wherein the residual vacuum continues to dewater the mat formed and further washing shower residual is collected and returned to the clear filtrate well. The splitter and sealer baffle 53 and 65, respectively, are also variable in their radial position by means of an extension rod 75 which functions in the same manner previously described for control push rod 59.

It should now be appreciated by one skilled in the art that the positioning of the seal plate 58 substantially effects the valve timing by permitting a longer or shorter atmospheric drain from Chamber A into drain 39 and thereby varying the total vacuum application. The vacuum filtrate may be further separated into clear and cloudy filtrate portions by the adjustable separator splitter 53 and sealer baffle 65 effecting distribution to the appropriate barometric leg drain 72 or 73. Further, the final atmospheric drain of clear liquid filtrate may now be separated and sent to the clear filtrate well 18. It should now be clear that the objectives of the invention are hereby obtained not only for disc filters but for other rotary type filters.

Having described the invention in terms of a preferred embodiment, Applicants do not wish to be limited in the scope of their invention except as claimed:

We claim:

1. An adjustable valve for a filter comprising means comprising:
    a hollow body having one end substantially open for receiving filtrate of discretely varying composition from segmented collection channels radially disposed about the center of a filter shaft;
    a collection separation means having a plurality of port means for receiving said filtrate disposed at said one end of said body, each of said port means conducting said filtrate of varying composition to a plurality of discrete formed chambers located within said body;
    a means for withdrawing filtrate from each of said chambers connected to each of said chambers; and
    a means for varying volumes and locations of said chambers facilitated for adjustment during filter operation, for effecting timing of withdrawal of said filtrate from said segmented collection channels and distribution of filtrate to said means for withdrawing filtrate.

2. An adjustable valve for a disc filter according to claim 1 wherein: said collection separation means further comprises: a disc plate having radially disposed port means selectively distributed about its face.

3. An adjustable valve for a disc filter according to claim 2 wherein: said port means are in sealing contact with said collection channels to segregate the distribution of flow from said channels.

4. An adjustable valve for a disc filter according to claim 1 wherein: said means for withdrawing filtrate from each of said chambers further comprises: a plurality of atmospheric drains and a plurality of vacuum drains.

5. An adjustable valve for a disc filter according to claim 4 wherein: said plurality of atmospheric drains comprise a clear filtrate atmosphere drain and a cloudy filtrate atmospheric drain and said plurality of vacuum drains comprise a clear filtrate vacuum drain and a cloudy filtrate vacuum drain.

6. An adjustable valve for a disc filter according to claim 1 wherein: said means for varying the volumes of said chambers and for effecting timing of withdrawal and distribution of filtrate comprise: at least one movable valve member disposed in said body.

7. An adjustable valve for a disc filter according to claim 6 wherein said movable valve means comprises: a seal plate means in sliding contact with the interior of said hollow body for selectively separating cloudy atmospheric filtrate from cloudy vacuum filtrate entering said hollow body and a splitter plate means for selectively segregating clear vacuum filtrate from clear atmospheric filtrate collected within said valve body.

8. An adjustable valve for a disc filter according to claim 7 wherein: said seal plate and said splitter plate are movable by external adjustable means to selectively effect segregation of filtrate during operation.

9. An adjustable valve for a disc filter according to claim 1 wherein: said hollow body is disposed within a vacuum box and the vacuum is supplied by a barometric leg.

10. An adjustable valve for a disc filter according to claim 9 wherein: separate barometric legs are provided for a clear filtrate and a cloudy filtrate proportionately segregated in said valve.

11. An adjustable valve for a filter comprising means comprising:
- a hollow body having one end substantially open for receiving filtrate from segmented collection channels about the center of a filter shaft;
- a collection separation means having a plurality of port means for receiving said filtrate disposed at said one end of said body, each of said port means conducting said filtrate to a plurality of discrete chambers within said body;
- a means for withdrawing filtrate from each of said chambers;
- a means for varying volume and location of said chambers for effecting timing of withdrawal and distribution of said filtrate;
- said means for varying locations of said chambers and for effecting timing of withdrawal and distribution of said filtrate comprise a movable valve member operatively connected with said body;
- said movable valve member comprises a seal plate means for selectively separating cloudy atmospheric filtrate from cloudy vacuum filtrate and a splitter plate means for selectively segregating clear vacuum filtrate from clear atmospheric filtrate collected within said valve body; and
- said seal plate and said splitter plate being movable by external adjustable means further comprising hand wheel operated extension rods.

* * * * *